(12) United States Patent
Redon et al.

(10) Patent No.: US 6,519,124 B1
(45) Date of Patent: Feb. 11, 2003

(54) MAGNETIC TUNNEL JUNCTION READ HEAD USING A HYBRID, LOW-MAGNETIZATION FLUX GUIDE

(75) Inventors: Olivier Redon, Saku (JP); Satoru Araki, Saku (JP)

(73) Assignee: TDK Corporation, Tokyo (JP)

( * ) Notice: Subject to any disclaimer, the term of this patent is extended or adjusted under 35 U.S.C. 154(b) by 77 days.

(21) Appl. No.: 09/621,003

(22) Filed: Jul. 20, 2000

Related U.S. Application Data

(60) Provisional application No. 60/192,320, filed on Mar. 27, 2000.

(51) Int. Cl.[7] ............................................... G11B 5/39
(52) U.S. Cl. ..................................... 360/324.2; 360/321
(58) Field of Search ........................... 360/321, 324.1, 360/324.11, 324.12, 324.2, 126, 317

(56) References Cited

U.S. PATENT DOCUMENTS

| | | | |
|---|---|---|---|
| 3,908,194 A | | 9/1975 | Romankiw .................. 360/113 |
| 3,940,797 A | | 2/1976 | Brock et al. ................ 360/113 |
| 5,159,513 A | | 10/1992 | Dieny et al. ............... 360/113 |
| 5,493,467 A | * | 2/1996 | Cain et al. .................. 360/120 |
| 5,627,704 A | * | 5/1997 | Lederman et al. ......... 360/126 |
| 5,666,248 A | * | 9/1997 | Gill ........................ 360/324.1 |
| 5,828,530 A | * | 10/1998 | Gill et al. ................... 360/319 |
| 5,862,022 A | | 1/1999 | Noguchi et al. ........... 360/113 |
| 5,894,385 A | * | 4/1999 | Gill et al. ................... 360/321 |
| 5,898,547 A | | 4/1999 | Fontana, Jr. et al. ....... 360/113 |
| 5,898,548 A | | 4/1999 | Dill et al. ................... 360/113 |
| 5,901,018 A | | 5/1999 | Fontana, Jr. et al. ....... 360/104 |
| 5,905,611 A | * | 5/1999 | Yoda et al. ............... 360/324.1 |
| 5,909,344 A | * | 6/1999 | Gill ............................ 360/321 |
| 5,930,087 A | * | 7/1999 | Brug et al. ................. 360/126 |
| 6,223,420 B1 | * | 5/2001 | Lee et al. ................. 29/603.14 |

FOREIGN PATENT DOCUMENTS

JP      10-334418      *  12/1998

OTHER PUBLICATIONS

Coehoorn et al., "The Electrical and Magnetic Response of Yoke–Type Read Heads Based On A Magnetic Tunnel Junction", IEEE Transactions on Magnetics, vol. 35, No. 5, Sep. 1999, pp. 2586–2588.

Moodera et al., "Geometrically Enhanced Magnetoresistance in Ferromagnet–Insulator–Ferromagnet Tunnel Junctions", Jul. 29, 1996, Appl. Phys. Lett. 69 (5), Jul. 29, 1996, pp. 708–710.

Moodera et al., "Large Magnetoresistance At Room Temperature In Ferromagnetic Thin Film Tunnel Junctions", Phsical Review Letters vol. 74, No. 16, Apr. 17, 1995, pp. 3273–3276.

Parkin et al., "Exchange–Biased Magnetic Tunnel Junctions And Application To Nonvolatile Magnetic Random Access Memory (Invited)", Journal of Applied Physics, vol. 85, No. 8, Apr. 15, 1999, pp. 5828–5833.

* cited by examiner

*Primary Examiner*—David L. Ometz
(74) *Attorney, Agent, or Firm*—Morgan, Lewis & Bockius LLP

(57) ABSTRACT

The present invention relates to a magneto-resistive tunnel junction read head having a multi-layer tunnel junction composed of a tunnel barrier layer sandwiched between a ferromagnetic free layer and a ferromagnetic pinned layer. Contiguous with the free layer is a hybrid, low-magnetization, T-shaped flux guide having a rear flux guide portion and a more narrow front flux guide portion. The front flux guide portion constitutes a part of an ABS (Air Bearing Surface). The rear portion entirely covers and overlaps the tunnel junction. The hybrid flux guide has a lower magnetization -than the sensing layer due to the addition of magnetization reducing elements such as Ta or Nb. Using this design, a tunnel junction read head has improved read performance and achieves a high and stable head output for adaptation to ultrahigh density recording.

25 Claims, 6 Drawing Sheets

MAGNETIC TUNNEL JUNCTION READ HEAD USING A HYBRID, LOW-MAGNETIZATION FLUX GUIDE

This application claims the benefit of U.S. Provisional Application No. 60/192,320, filed on Mar. 27, 2000.

BACKGROUND OF THE INVENTION

1. Field of the Invention

The present invention relates to the art of magnetic tunnel junction read heads, which sense magnetic fields in a magnetic recording medium. It finds particular application in conjunction with reading hard disk drives and will be described with particular reference thereto. However, it is to be appreciated that the invention will find application with other magnetic storage media. Further, it is to be appreciated that the invention will find application in other magnetic field detection devices as well as in other devices and environments.

2. Description of the Related Art

Magneto-resistive (MR) sensors based on anisotropic magneto-resistance (AMR) or a spin-valve (SV) effect are widely known and extensively used as read transducers to read magnetic recording media. Such MR sensors can probe the magnetic stray field coming out of transitions recorded on a recording medium by generating resistance changes in a reading portion formed of magnetic materials. AMR sensors have a low resistance change ratio or magneto-resistive ratio $\Delta R/R$, typically from 1 to 3%, whereas SV sensors have a $\Delta R/R$ ranging from 2 to 7% for the same magnetic field excursion. SV heads showing such high sensitivity are able to achieve very high recording densities, that is, over several giga bits per square inch or Gbits/in$^2$. Consequently, SV magnetic read are progressively supplanting AMR read heads.

In a basic SV sensor, two ferromagnetic layers are separated by a non-magnetic layer, an example of which is described in U.S. Pat. No. 5,159,513. An exchange or pinning layer of FeMn is further provided adjacent to one of the ferromagnetic layers. The exchange layer and the adjacent ferromagnetic layer are exchange-coupled so that the magnetization of the ferromagnetic layer is strongly pinned or fixed in one direction. The magnetization of the other ferromagnetic layer is free to rotate in response to a small external magnetic field. When the magnetizations of the ferromagnetic layers are changed from a parallel to an anti-parallel configuration, the sensor resistance increases yielding a relatively high MR ratio.

Recently, new MR sensors using tunneling magneto-resistance (TMR) have shown great promise for their application to ultra-high density recordings. These sensors, which are known as magnetic tunnel junction (MTJ) sensors or magneto-resistive tunnel junctions (MRTJ), came to the fore when large TMR was first observed at room temperature. See Moodera et al, "Large magneto resistance at room temperature in ferromagnetic thin film tunnel junctions," *Phys. Rev. Lett.* v. 74, pp. 3273–3276 (1995). Such MTJs have achieved an MR ratio of over 12%.

As the demand for ultra-high density recording grows, MTJ sensors seem likely to replace SV sensors in the near future. However, before that can happen, a new MTJ head structure is needed that can maximize the TMR properties.

Like SV sensors, MTJ sensors basically consist of two ferromagnetic layers separated by a non-magnetic layer. One of the magnetic layers has its magnetization fixed along one direction, i.e., the pinned layer, while the other layer, i.e., free or sensing layer, is free to rotate in an external magnetic field.

However, unlike SV sensors, the non-magnetic layer in MTJ sensors is a thin insulating barrier or tunnel barrier layer. Further, unlike SV sensors, MTJ sensors operate in CPP (Current Perpendicular to the Plane) geometry, which means its sensing current flows in a thickness direction of a laminate film or orthogonal to the surfaces of the ferromagnetic layers.

The sense current flowing through the tunnel barrier layer is strongly dependent upon a spin-polarization state of the two ferromagnetic layers. When the sense current experiences the first ferromagnetic layer, the electrons are spin polarized. If the magnetizations of the two ferromagnetic layers are anti-parallel to each other, the probability of the electrons tunneling through the tunnel barrier is lowered, so that a high junction resistance $R_{ap}$ is obtained. On the other hand, if the magnetizations of the two ferromagnetic layers are parallel to each other, the probability of the electrons tunneling is increased and a high tunnel current and low junction resistance $R_p$ is obtained. In an intermediate state between the parallel and anti-parallel states, such as when the both ferromagnetic layers are perpendicular in magnetization to each other, a junction resistance $R_m$ between $R_{ap}$ and $R_p$ is obtained such that $R_{ap}<R_m<R_p$. Using these symbols, the MR ratio may be defined as $\Delta R/R=(R_{ap}-R_p)/R_p$.

The relative magnetic direction orientation or angle of the two magnetic layers is affected by an external magnetic field such as the transitions in a magnetic recording medium. This affects the MTJ resistance and thus the voltage of the sensing current or output voltage. By detecting the change in resistance and thus voltage based on the change in relative magnetization angle, changes in an external magnetic field are detected. In this manner, MTJ sensors are able to read magnetic recording media.

One problem with MTJ sensors is an enlarged read gap. U.S. Pat. No. 5,729,410 discloses an example wherein a MTJ sensor or element is applied to a magnetic head structure. The MTJ sensor is sandwiched between two parallel electrical leads or electrodes, which are in turn sandwiched between first and second insulating gap layers of alumina or the like to form a read gap. A pair of magnetic shield layers are further formed to sandwich therebetween the first and second insulating gap layers. In this example, the read gap is enlarged at a sensing or head end surface, i.e., an ABS (Air Bearing Surface), which confronts a magnetic recording medium. Thus, a MTJ head of this design is handicapped for application to high-density recording. Moreover, the biasing efficiency of this structure is poor due to the separation between the free layer and the permanent magnets. If the permanent magnets are formed in an overlapping manner on the TMR film, a strong decrease of the TMR ratio is yet expected due to a large difference of the junction resistance in the regions below and in between the permanent magnets.

U.S. Pat. Nos. 5,898,547, 5,898,548 and 5,901,018 disclose other examples wherein a MTJ sensor is applied to a magnetic head structure. In these publications, technical improvements are mainly proposed for adaptation to ultra-high density recordings. However, the demand for development of MTJ heads for ultrahigh density recording has surpassed these improvements and proposals for more advanced TMR magnetic heads are demanded.

Another problem is a trade-off between high TMR ratio and MTJ resistance. The TMR ratio is proportional to the spin polarization of the two ferromagnetic layers. A TMR ratio as high as 40% was achieved by choosing a preferable composition for the two ferromagnetic layers. See Parkin et aL, "Exchange-biased magnetic tunnel junctions and application to nonvolatile magnetic random access memory," *J App. Phys.*, v. 85, pp. 5828–5833 (Apr. 15, 1999). However, despite this large TMR ratio, the application of such MTJs in read heads was, up to now, prohibitory due to the large resistance of the junctions, resulting in a large shot noise $V_{rms}$ and a poor signal to noise ratio S/N. Shot noise $V_{rms} = (2 \cdot e \cdot I \cdot \Delta f)^{1/2} \times R$, where: $e=1.6 \times 10^{-19}$ C; I=current; $\Delta f$=bandwidth; and R=junction resistance.

It is possible to reduce the MTJ's resistance-area product R·A or RA using a natural, in situ oxidation method. RA is a characteristic of an insulating barrier and contributes to junction resistance R through the equation R=R·A/junction area. Using a 7 Å or less Al layer that is properly oxidized, an RA as low as 15 $\Omega \cdot \mu m^2$ has been achieved. This remarkably low value together with the high TMR ratio make MTJs very attractive for application as read heads for very high recording densities.

However, yet another problem in MTJs is that the thin insulating barrier is very sensitive to one of the manufacturing processes called lapping. Lapping involves the definition of an air bearing surface (ABS) on the MTJ head. Because the insulating barrier is so thin, lapping can create electrical shorts between the two adjacent magnetic layers, rendering the sensor useless. Actual designs thus include a front flux guide to protect the barrier during lapping. U.S. Pat. No. 5,898,547 proposed a design wherein the flux guide is made from the sensing layer. Obviously this design avoids any magnetic interruption between the flux guide and the sensing layer, which improves the magnetic efficiency of the flux guide. However, the large TMR ratio requires CoFe material within the sensing layer, and such large magnetization is inappropriate to get the highest efficiency of the flux guide. Thus, the design makes a compromise between high TMR ratio and high flux guide efficiency to get the largest output.

Therefore, a goal of the present invention is a read head design wherein the TMR ratio is be maximized by choosing MTJ materials with the largest spin-polarization and wherein the flux guide efficiency is optimized using hybrid low-magnetization materials to achieve a large signal output.

Another goal of the present invention is to provide a design wherein the junction area is enlarged to keep reasonable dimensions for high recording density, while maintaining the S/N at a high value.

Another object of the present invention is to provide a MTJ head with a high biasing efficiency and no reduction in TMR ratio to ensure a high and stable head output for adaptation to ultra high-density recording.

BRIEF SUMMARY OF THE INVENTION

In accordance with one aspect of the present invention, an MTJ read head of the present invention comprises a magnetic tunnel junction read head having a sensing surface for sensing data magnetically recorded on a magnetic recording medium. The magnetic tunnel junction includes a tunnel barrier layer sandwiched between a ferromagnetic sensing layer and a ferromagnetic pinned layer. A ferromagnetic flux guide is magnetically coupled to the sensing layer. The flux guide extends to the sensing surface and has a magnetization lower than a magnetization of the sensing layer.

In a more limited aspect of the invention, the sensing layer is recessed from the sensing surface.

In another more limited aspect of the invention, the flux guide includes NiFeX where X is one or more of Ta, Nb, Cu, Cr, W, Al, Au, In, Ir, Mg, Rh, and Ru.

In yet another more limited aspect of the invention, the flux guide has a front portion and a back portion. The front portion has a width Ffw and extends generally along a length Fh from a front of the magnetic tunnel junction to the sensing surface. The back portion has a width Fbw and is adjacent the magnetic tunnel junction. Further, Ffw is less than a magnetic tunnel junction width Jw and Fbw is greater than Jw.

One advantage of the present invention is that the separate hybrid low magnetization flux guide greatly increases the output signal because the flux guide efficiency is improved. A high TMR ratio is maintained by the proper choice of materials involved in the sensing layer. Because the output signal is very high, the junction area can be significantly enlarged without degrading the S/N. This enables the design to function with very high recording densities beyond 100 Gbits/in².

Still further advantages of the present invention will become apparent to those of ordinary skill in the art upon reading and understanding the following detailed description of the preferred embodiments.

BRIEF DESCRIPTION OF THE DRAWINGS AND TABLES

The invention may take form in various components and arrangements of components, and in various steps and arrangement of steps. The drawings are only for purposes of illustrating a preferred embodiment and are not to be construed as limiting the invention.

FIG. 1 is a perspective view of a first preferred embodiment of the MTJ read head of the present invention showing generally the main active elements of the active area, namely the MTJ (in dashed lines), the flux guide and the biasing means;

FIGS. 2, 3, and 4 are vertical cross-sectional views through a center of an MTJ read head of the present invention in a plane parallel to the ABS illustrating a process of forming the MTJ read head structure of the first embodiment;

DETAILED DESCRIPTION OF THE PREFERRED EMBODIMENTS

Figure 1:
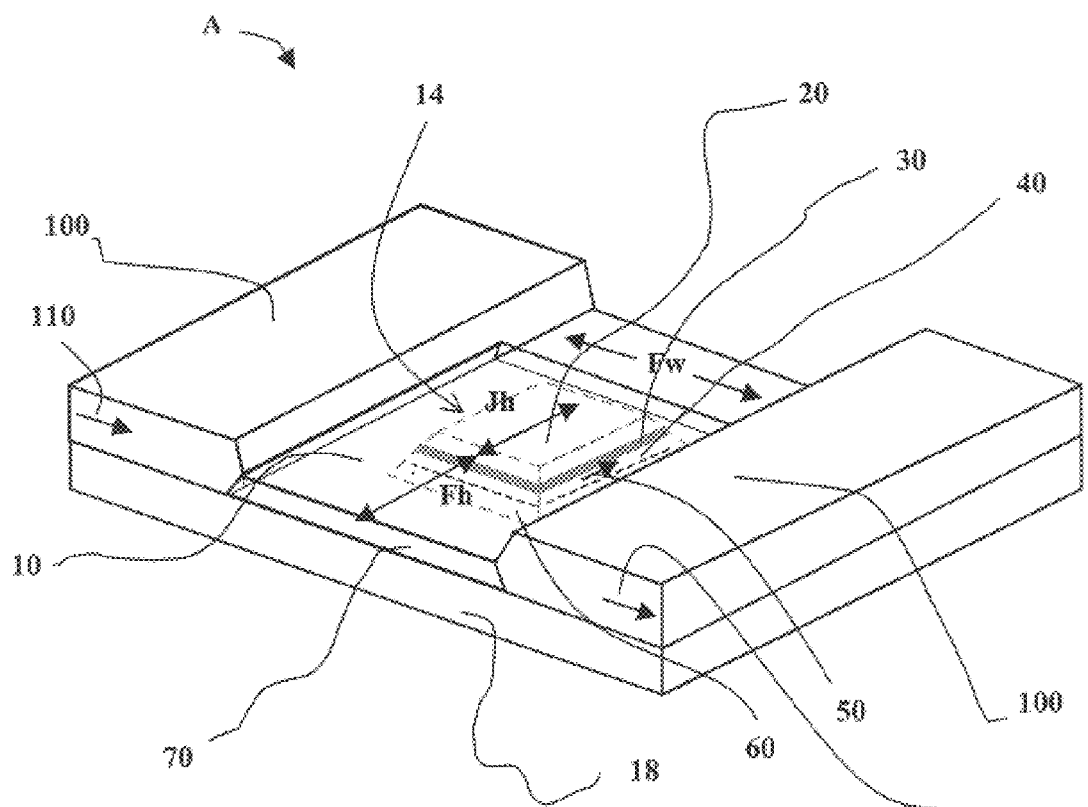

With reference to FIG. 1, in a first preferred embodiment, a MTJ sensor or read head includes a hybrid, low-magnetization flux guide 10 contiguous with a multi-layer tunnel portion or MTJ 14 (shown in dashed lines), which is embedded in a bottom read head gap 18. The MTJ exhibits a magneto-resistive spin tunnel effect. The MTJ comprises a ferromagnetic sensing or free layer 20 formed on one side of an insulating layer 30, and a ferromagnetic pinned layer 40 formed on the other side. The pinned layer has a magnetization direction 50, which is fixed by exchange coupling with an anti-ferromagnetic (AF) pinning or exchange layer 60 formed underneath. In an alternative embodiment, the pinned layer is a synthetic anti-ferromagnet. The whole MTJ head structure defines an ABS 70, which confronts a magnetic recording medium (not shown) and which is orthogonal to the pinned layer magnetization.

The width of the flux guide in the plane of the ABS defines the track width of the MTJ read head. This is generally the same width as a string of sequential storage units or bits in a corresponding magnetic storage media such as a hard disk drive. The MTJ is shown with angled sides, which result from the manufacturing process described below. A flux guide height Fh is defined to be a distance between the ABS and a front end of the MTJ. A junction height Jh is defined to be a length of the MTJ in a direction orthogonal to the ABS. Because of the slightly angled sides of the MTJ, the area dimensions of the MTJ are defined to be the area dimensions of the insulating barrier.

In the first preferred embodiment, the sensing layer of the MTJ is a multi-layer comprising NiFe and CoFe ferromagnetic materials to obtain a large TMR ratio. Preferably, the thickness of the NiFe layer is greater than or equal to 10 Å and the thickness of the CoFe layer is greater than or equal to 15 Å and less than or equal to 40 Å.

The insulating layer is preferably made from a thin layer of Al-Ox, which is Al properly oxidized using a conventional, natural, in situ oxidation method. Alternatively, the insulating barrier may be formed of $Al_2O_3$, NiO, GdO, MgO, $Ta_2O_5$, $MoO_2$, $TiO_2$, $WO_2$ or the like. The thickness of the tunnel barrier layer 30 is desired to be as thin as possible for reducing the resistance of the element. However, if the thickness becomes too thin to cause pin holes, a leak current is generated, which is not preferable. In general, the thickness is set to about 5 Å to 20 Å.

The pinned layer comprises a sandwich of CoFe, Ru, and CoFe layers. The pinning layer is preferably of an AF material, such as PtMn, PdPtMn, IrMn, FeMn or NiMn. However, it is to be appreciated that the pinning layer is not limited to these AF materials and may even be ferromagnetic materials as long as it serves a pinning function. The bottom read head gap is formed of deposited aluminum oxide $Al_2O_3$.

In alternative embodiments, the ferromagnetic free layer and pinned layer are made with a wide variety of high spin polarization materials, such as Fe, Co, Ni, FeCo, NiFe, CoZrNb or FeCoNi to obtain a high TMR ratio. Further, each layer consists of a single layer of material or a laminate body having two or more layers.

In the first preferred embodiment, the separate flux guide is hybrid material of low magnetization materials such as alloy compounds of NiFeX, where X is one or more of Ta, Nb, Cu, Cr, W, Al, Au, In, Ir, Mg, Rh, Ru, and/or the like. The addition of element X reduces the NiFe magnetization. Generally, the flux guide materials are selected to have lower magnetization than the ferromagnetic material used for the contiguous ferromagnetic layer, which in this embodiment is the sensing layer. The flux guide is in magnetic contact or magnetically coupled or in ferromagnetic exchange with the sensing layer to insure a good exchange stiffness between the two layers, which is important to get a coherent rotation of the magnetizations of these layers in an external magnetic field. To achieve good magnetic contact, the sensing layer is pre-cleaned, the flux guide is sputter deposited onto the sensing layer, and then the guide is ion milled. The flux guide, having a width Fw, is generally rectangular-shaped and has a planar area or region wider than a planar region of the MTJ. Preferably, the MTJ height Jh is $(0.8 \times Fw) \leq Jh \leq (3 \times Fw)$.

Permanent magnets 100 or biasing means having magnetization direction 110 are attached at lateral or opposite ends of the flux guide. Material making up the permanent magnets is deposited onto the bottom read head gap using conventional deposition methods. The material is then initialized or magnetized with a very strong magnetic field to form the permanent magnets.

The biasing means creates a single domain configuration both in the flux guide and in the sensing layer. The magnetization direction 110 is perpendicular to the pinned layer magnetization and parallel to the ABS. The flux guide, biasing means, and MTJ make up the active part of the MTJ read head.

Figure 2:
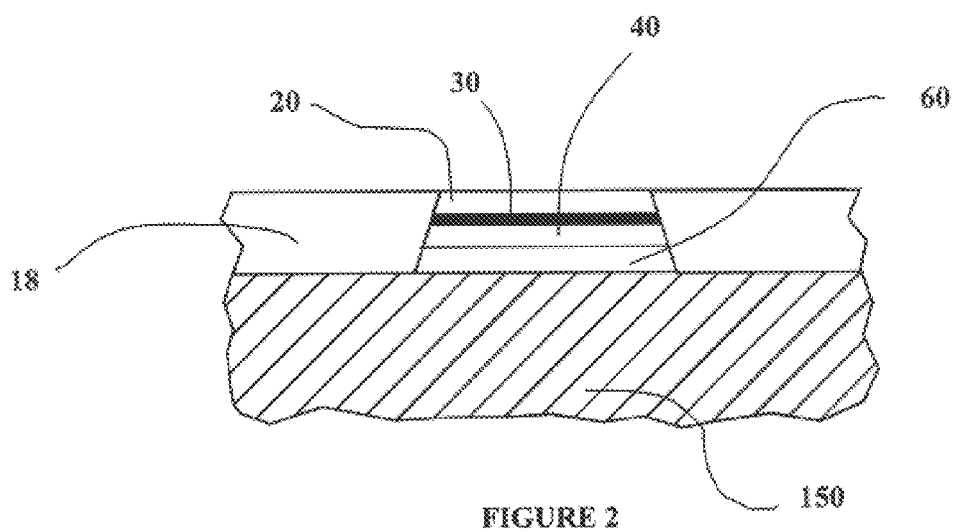
Figure 3:
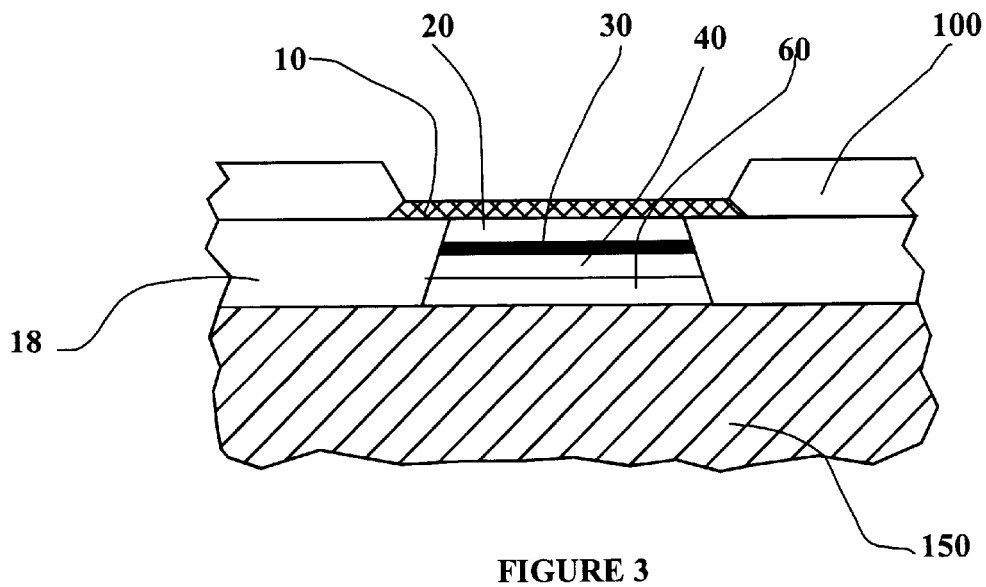
Figure 4:
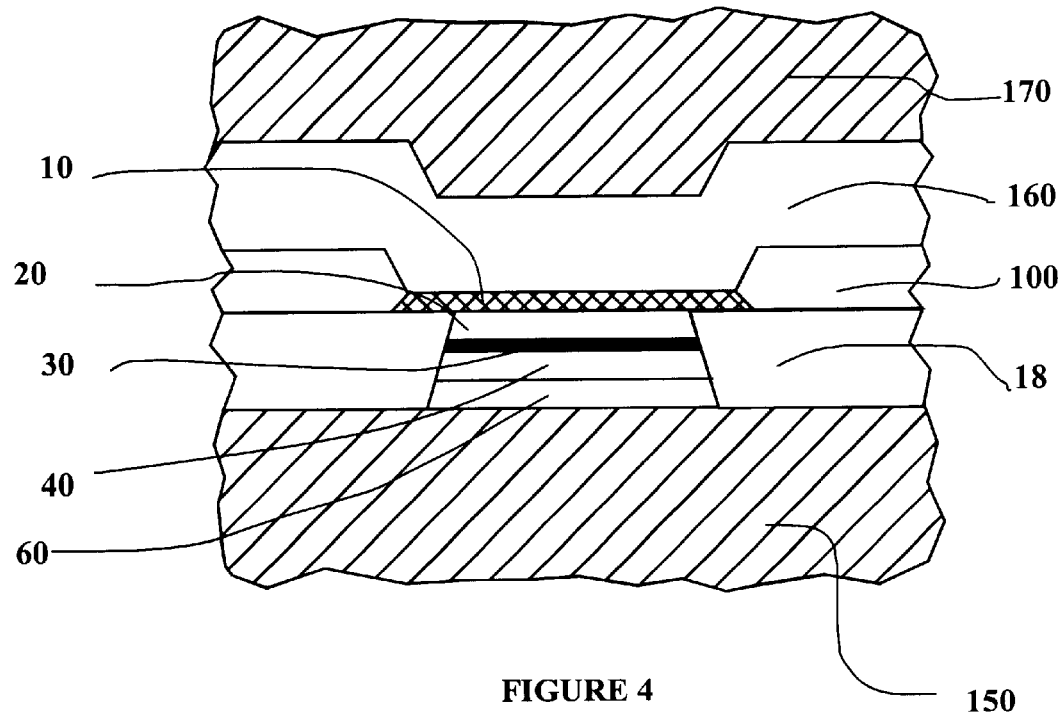

With reference to FIGS. 2, 3, and 4, the process to form the MTJ read head of the first preferred embodiment is illustrated. Generally, conventional manufacturing methods are used such as photo-resist, ion milling, lift-off and sputtering techniques. Because these are known, an explanation of the details of the individual methods is omitted here.

With continuing reference to FIG. 2, a MTJ is formed on top of a bottom shield 150. The shield acts as a substrate and an electrical lead to carry the sense current to the MTJ. The shield may be made of NiFe (Permalloy), Sendust, CoFe or CoFeNi.

In an alternative embodiment, the MTJ and flux guide design of FIG. 1 is reversed or flipped upside down. In this alternative embodiment, the flux guide is deposited onto a bottom gap followed by the free layer, the insulating layer, the pinned layer and pinning layer. This reversal merely creates an alternative structure that does not affect any of the physical characteristics of the MTJ read head.

In one example of the first preferred embodiment, the multi-layer MTJ comprises the following layers, from the bottom to the top:

Buffer layer: Ta 85 Å and NiFe 20 Å

Pinning layer: PtMn 300 Å

Pinned layer: CoFe 25 Å, Ru 9 Å, and CoFe 25 Å

Insulator barrier: Al—Ox 7 Å

Sensing layer: CoFe 15 Å and NiFe 30 Å

The pinned layer 40 is a synthetic AF film to minimize the magneto-static coupling acting on the sensing layer and the flux guide. Synthetic AF films are strongly required in MTJ read heads to control the output asymmetry because the sense current, flowing perpendicularly, is ineffective at counterbalancing the magneto-static coupling. The tunnel barrier 30 is fabricated from a 7 Å thick Al layer properly oxidized using a conventional in situ natural oxidation method. With this oxidation method, an RA as low as 30 $\Omega \cdot \mu m^2$ was achieved. The sensing layer 20 is a double layer of NiFe and CoFe. The CoFe thickness is not be smaller than 15 Å to insure a high spin-polarization but is not larger than 40 Å to keep low coercivity. The NiFe layer does not improve the spin-polarization but reduces the coercivity of the CoFe layer. A minimum of 10 Å NiFe is required to observe a significant decrease of the CoFe coercivity.

The MTJ is then patterned into a square using a resist mask and ion milling. Again, the MTJ is shown in FIGS. 2, 3, and 4 with angled sides, which result from the ion milling process.

The sides of the MTJ are embedded in $Al_2O_3$ to prevent electrical short of the insulating barrier. This $Al_2O_3$ layer also defines the bottom gap 18 of the read head.

With reference to FIG. 3, after a soft cleaning process of the sensing layer surface to insure a good magnetic contact, the flux guide is sputter deposited on top of the sensing layer. The flux guide is made of a NiFeX alloy where X is more preferably Ta or Nb. The flux guide 10 is then patterned into a square, which is wider than the MTJ. Biasing means 100 are attached on lateral sides of the flux guide by a lift-off process.

With reference to FIG. 4, which shows a complete MTJ read head, a metal or top gap 160 is sputter deposited on the structure. A second or top shield 170 is then added to complete the head structure. The top gap 160 is metallic to insure an electrical contact between the MTJ and the top shield. This closes the electrical circuit for the sensing current from the bottom shield 150 to top shield 170. The gaps are fixed by disk density, specifically, the length of each bit in a track. The bottom and top gaps allow the magnetic flux from the magnetic recording media to concentrate in the flux guide rather than leak into the shield.

Using the design of the first preferred embodiment, different materials were evaluated for the flux guide. Table 1 shows the output voltages and the signal to noise ratio S/N for the first embodiment (designed for 20 Gbits/in$^2$) for various flux guide compositions and various preferred flux guide heights Fh.

TABLE 1

Output voltage and S/N for various front flux guide compositions and various flux guide heights Fh

| | Front flux guide height Fh | | | | | |
|---|---|---|---|---|---|---|
| | 0.1 $\mu$m | | 0.2 $\mu$m | | 0.3 $\mu$m | |
| | Output | S/N | Output | S/N | Output | S/N |
| 70 Å NiFeTa | 3095 $\mu$V | 24.2 dB | 1856 $\mu$V | 19.7 dB | 1010 $\mu$V | 14.4 dB |
| 40 Å NiFe | 3325 $\mu$V | 24.8 dB | 2017 $\mu$V | 20.4 dB | 1090 $\mu$V | 15.1 dB |
| 40 Å NiFeTa | 5440 $\mu$V | 29.1 dB | 3098 $\mu$V | 24.2 dB | 1625 $\mu$V | 18.6 dB |
| 40 Å NiFeNb | 6170 $\mu$V | 30.1 dB | 3488 $\mu$V | 25.2 dB | 1823 $\mu$V | 19.6 dB |
| 40 Å NiFeTa without coupling | 2847 $\mu$V | 23.4 dB | 1293 $\mu$V | 16.6 dB | 547 $\mu$V | 9.1 dB |
| Free as FFG | 1930 $\mu$V | 20.1 dB | 1192 $\mu$V | 15.9 dB | 729 $\mu$V | 11.6 dB |

In this evaluation, an MTJ design for reading a medium having a recorded density of 20 Gbits/in$^2$ was adopted. Thus, the following dimensions were used: distance of bottom shield to top shield 0.11 $\mu$m; MTJ area of 0.3×0.3 $\mu$m$^2$; flux guide area of 0.4×0.4 $\mu$m$^2$; Fh=0.1 $\mu$m; and biasing means of CoPt permanent magnets that are 300 Å thick. The MTJ had the same composition and dimensions as the MTJ in the first preferred embodiment. This yielded a TMR ratio of 27% TMR and RA=35 $\Omega \cdot \mu$m$^2$.

All the MTJ heads were evaluated on the same disk (Mr·t=0.32 memu/cm$^2$, Hc=4000 Oe), and with the same sense current of 0.3 mA. This current was chosen to give a low bias voltage of 120 mV, required for a long lifetime of MTJ heads. Looking at this table, it is clear that the flux guide made of materials with low magnetization, namely NiFeTa and NiFeNb, gave the highest output signal, i.e., >5.4 mV or 18 mV/$\mu$m TW for a 40 Å thick flux guide and Fh=0.1 $\mu$m, and the largest S/N.

If the magnetic contact between the sensing layer and the flux guide is lost, such as when the surface of the sensing layer is slightly oxidized, the output is strongly degraded because the magnetizations in the flux guide and the sensing layer are not rotating coherently. This effect is seen in the output differences between NiFeTa and NiFeTa without coupling, where decoupling is achieved by introducing an oxide layer between the free layer and the flux guide.

It is noted that an MTJ design wherein the sensing layer is used as flux guide produces the lowest output voltage. Further, the design yields such a poor S/N that it is even lower than the S/N for conventional spin-valve heads.

Figure 5:
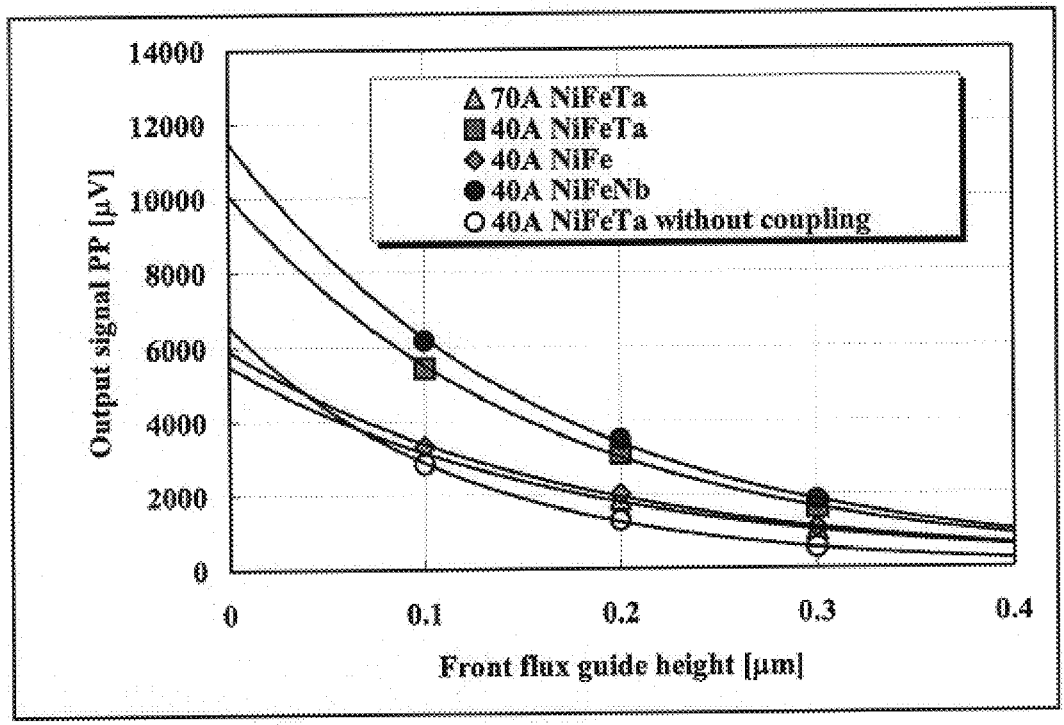
FIG. 5 shows the output voltage dependency on the front flux guide height Fh for various compositions of the flux guide.

With reference to FIG. 5, the output signal is clearly dependent on Fh with respect to all of the flux guide materials tested. More specifically, the smaller Fh is, the greater the output signal is. Thus, it becomes apparent that flux guides made of low magnetization materials have a large potential for high recording density, especially if Fh can be reduce below 0.1 $\mu$m.

Figure 6:
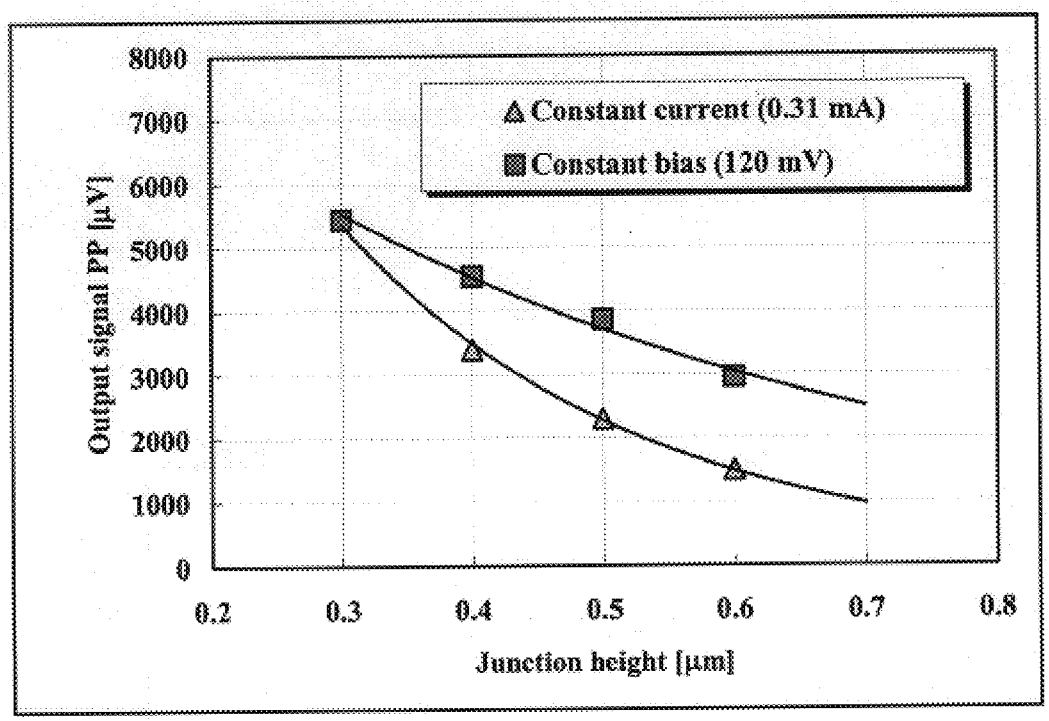
FIG. 6 shows the output voltage dependency on the junction height Jh at constant sense current and constant bias voltage.

Indeed, the output of MTJ read heads using 40 Å NiFeTa as a flux guide is so high that one can afford to increase Jh to decrease the junction resistance. With reference to FIG. 6 and Table 2, the output voltage is shown to be dependent on Jh such that the smaller Jh, the greater the output signal. This applies for both constant current through and constant bias or voltage across the MTJ.

TABLE 2

Output and S/N for different Junction heights

| Height Jh ($\mu$m) | Output (I = 0.31 mA) | Output (V = 120 mV) | Rj ($\Omega$) | S/N (dB) |
|---|---|---|---|---|
| 0.3 | 5440 $\mu$V | 5440 $\mu$V | 389 | 29.08 |
| 0.4 | 3388 $\mu$V | 4545 $\mu$V | 292 | 28.65 |
| 0.5 | 2294 $\mu$V | 3862 $\mu$V | 233 | 28.12 |
| 0.6 | 1477 $\mu$V | 2955 $\mu$V | 194 | 26.46 |

More particularly, Table 2 shows the output voltages at constant current and constant bias, junction resistance Rj, and S/N for the first embodiment (designed for 20 Gbits/in2) with various junction heights Jh.

With continuing reference to Table 2, in the first column, the output for constant current is rapidly decreasing with height. However, for a constant bias voltage (120 mV), the decrease is more limited. As the noise associated with the junction resistance is also decreased, the S/N remains high even if Jh is doubled. Considering that a large junction area not only reduces the junction resistance and the associated shot noise but also pushes the limits of the lithography process to higher densities, a design wherein the junction width is wider than the track width TW has been evaluated.

Figure 7:
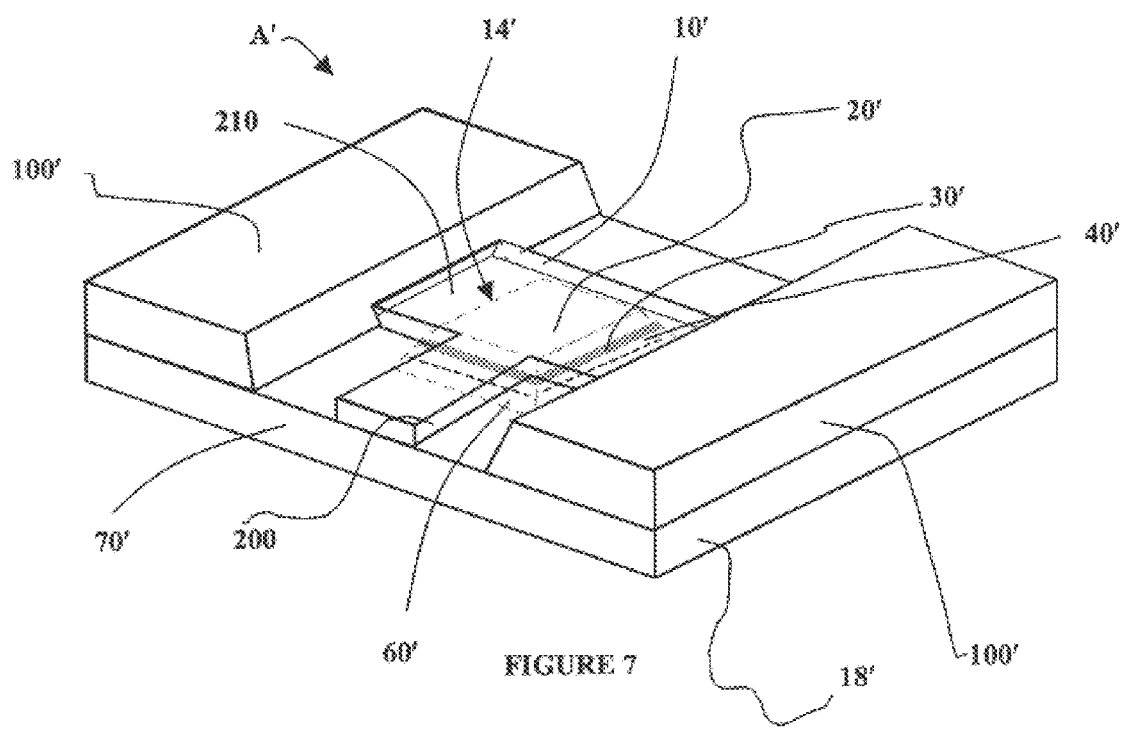
FIG. 7 is a perspective view of a second preferred embodiment showing an MTJ read head with a T-shaped flux guide.

With reference to FIG. 7, a second preferred embodiment of an MTJ read head A' includes most notably a separate T-shaped flux guide 10' having a rectangular front portion 200 and a rectangular rear portion 210. Same or analogous elements with FIG. 1 have the same reference numerals but are distinguished with a prime.

Figure 8:
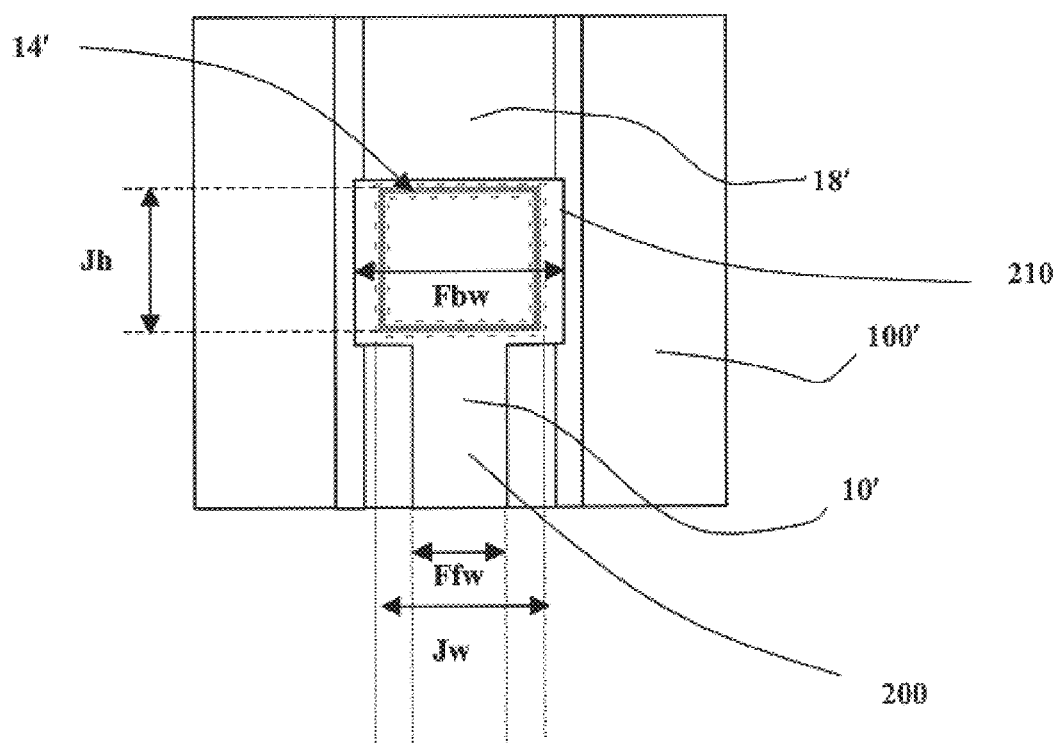
FIG. 8 is a top view of the second preferred embodiment defining various dimensions of the flux guide and of the MTJ.

With reference to FIG. 8, the front flux guide portion 200 forms a part of the ABS 70'. The front portion has a width Ffw at the ABS 70'. Thus, the track width TW=Ffw. The rear flux guide portion 210 has a width Fbw. Biasing means 100' are contiguous with lateral ends of the rear flux guide portion.

Ffw is set smaller than the junction width Jw. With such a design the junction area can be enlarged, thus reducing its resistance and the associated shot noise, while the S/N is kept high. Ffw is reduced only between the ABS and the front end of the junction, i.e., generally over a distance Fh. At the rear, Fbw is set wider than the junction width Jw so that the upper surface of the sensing layer is still fully in contact with the flux guide. Having the rear flux guide portion greater in area than the junction area insures a good distribution of the magnetic flux over the junction area. Further, it keeps the biasing means sufficiently spaced from the sensing layer to avoid a strong bias field from the edges of the biasing means. This strong bias field is caused for example by permanent magnets and can reduce the active area.

The T-shaped flux guide is manufactured using a high-resolution negative resist and a double exposure of two bars or layers oriented at 90° and partially overlapped. It is to be appreciated that other manufacturing techniques may also be used to create the T-shaped flux guide.

Using this design, a set of MTJ heads were prepared having the following dimensions: Jh=0.3 µm; Fh=0.1 µm; and Ffw=0.3 µm. Jw was varied from 0.3 to 0.7 µm. Fbw, corresponding to the region that in port overlaps the sensing layer, was 0.1 µm wider than Jw. All the other dimensions were kept the same compared to the first embodiment. Thus, this head is also designed for a 20 Gbits/in$^2$ application. The results of the evaluation are in Table 3, which shows the output voltage at constant current and constant bias, junction resistance, and S/N for various Jw.

TABLE 3

Output and S/N for different junction widths.

| Width Jh (µm) | Output (I = 0.31 mA) | Output (V = 120 mV) | Rj (Ω) | S/N (dB) |
| --- | --- | --- | --- | --- |
| 0.3 | 5703 µV | 5703 µV | 389 | 29.5 |
| 0.4 | 4487 µV | 5935 µV | 292 | 31 |
| 0.5 | 2571 µV | 4230 µV | 233 | 28.9 |
| 0.6 | 2190 µV | 4309 µV | 194 | 29.8 |
| 0.7 | 1549 µV | 3597 µV | 167 | 28.6 |

Figure 9:
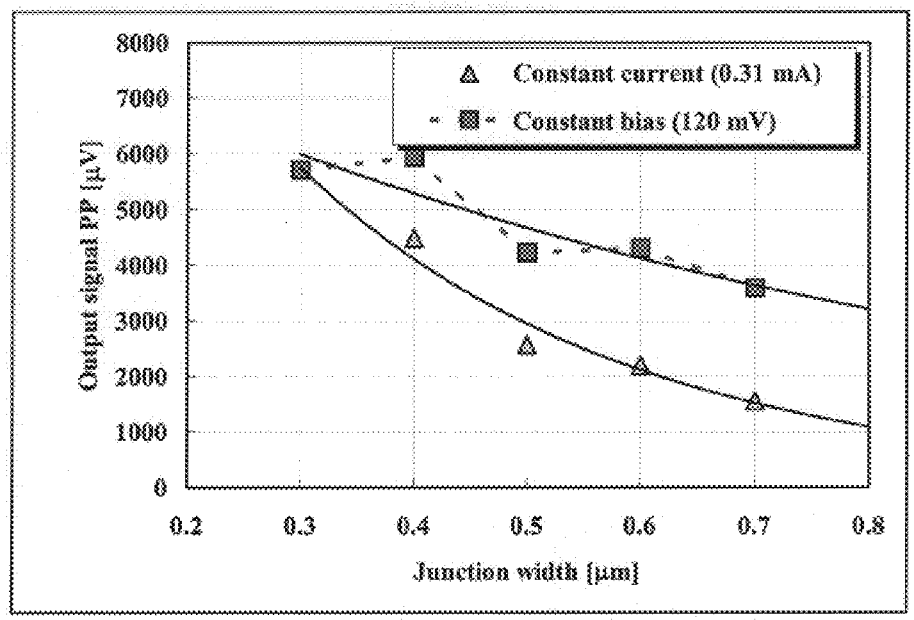
FIG. 9 shows the output voltage dependency on the junction width Jw at constant current and constant bias of the second preferred embodiment.

With reference to FIG. 9, the output voltage is plotted for constant current and constant bias versus Jw. Although the signal decrease at constant sense current is exponential, the decrease at constant bias is more step-like. Thus, the decrease of the average magnetic flux in the junction can be counterbalanced by the gain of sense current. From Table 3, one can see that even for Jw=0.6 µm, i.e., 2×Ffw, the S/N is higher than the S/N when Jw=Ffw. Therefore, the T-shaped design allows the use of wide junctions without loss of S/N, which is very promising for very high recording densities. Preferably, the MTJ width Jw is defined by (0.8×Ffw)≦Jw≦(3.0×Ffw), and the MTJ height Jh is defined by (0.8×Ffw)≦Jh≦(3.0×Ffw).

Figure 10:
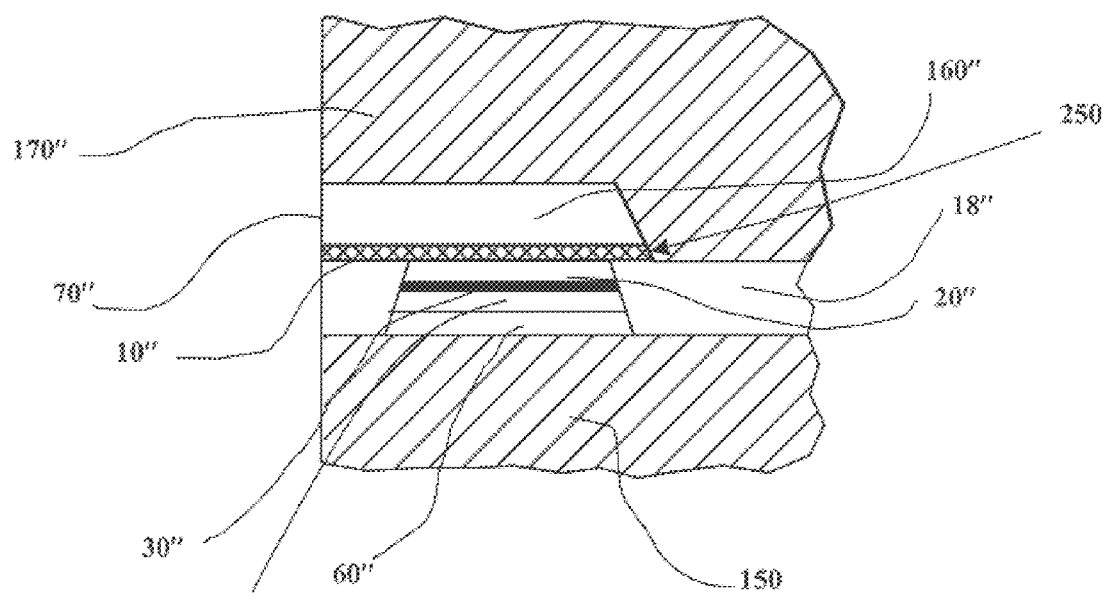
FIG. 10 is a vertical cross section of the center of the second preferred embodiment perpendicular to the sensing surface, which shows the magnetic connection between the flux guide and the second shield.

With reference to FIG. 10, in a third preferred embodiment, the second preferred embodiment is modified so that a rear flux guide end 250 is connected to the top shield 170". Same or analogous elements with FIG. 1 have the same reference numerals but are distinguished with a double prime. This design further improves the efficiency of the flux guide by decreasing or suppressing the magnetic charge on the back end of the flux guide. In other words, by contacting the flux guide with the top shield, the demagnetization field is reduced to zero. With this configuration, the flux decay along the flux guide height is further reduced and a higher output voltage is generated. Similarly, in an alternative embodiment, the rear end of the flux guide of the first preferred embodiment is also connected to the top shield.

For additional disclosure of various aspects of the present invention, U.S. patent application Ser. No. 09/517,580, which is entitled "Magneto-Resistive Tunnel Junction Head" is herein incorporated by reference. That application is directed to an MTJ read head with a particular structure of a ferromagnetic free layer for ultrahigh density recordings.

The invention has been described with reference to the preferred embodiments. Obviously, modifications and alterations will occur to others upon reading and understanding this specification. It is intended that the invention be construed as including all such modifications and alterations insofar as they come within the scope of the claims or equivalents thereof.

What is claimed is:

1. A magnetic tunnel junction read head having a sensing surface for sensing data magnetically recorded on a magnetic recording medium comprising:

a magnetic tunnel junction including a tunnel barrier layer sandwiched between a ferromagnetic sensing layer and a ferromagnetic pinned layer; and a ferromagnetic flux guide magnetically coupled to the sensing layer, the flux guide extending to the sensing surface and having a magnetization lower than a magnetization of the sensing layer, wherein the flux guide layer is generally rectangular-shaped and includes a first planar region wider than an adjacent second planar region of the sensing layer, the first planar region being parallel to a direction along which the sensing layer extends, and the entire second planar region is in contact with the first planar region.

2. A read head according to claim 1, wherein the sensing layer is recessed from the sensing surface.

3. A read head according to claim 2, wherein a flux guide height Fh is 0.01 µm≦Fh≦0.3 µm.

4. A read head according to claim 1, wherein the flux guide includes NiFeX where X is one or more of Ta, Nb, Cu, W, Al, Au, In, Ir, Mg, and Ru.

5. A read head according to claim 1, further comprising:

a magnetic biasing means in contact with the flux guide; and a metal gap in electrical contact with the flux guide and the biasing means.

6. A read head according to claim 5, further comprising:

a pair of magnetic conducting layers sandwiching the magnetic tunnel junction, the flux guide, and the metal gap, the pair of magnetic conducting layers forming an electrical circuit through which a sense current flows.

7. A read head according to claim 1, wherein the sensing surface is at a front of the head, the head further comprising:

a shield generally separated by a gap from a planar surface of the flux guide, the shield in contact with a rear end of the flux guide.

8. A read head according to claim 1, wherein said pinned layer includes a synthetic anti-ferromagnetic material.

9. A read head according to claim 1, wherein a magnetization of the pinned layer is fixed by exchange coupling with an anti-ferromagnetic material.

10. A read head according to claim 9, wherein the anti-ferromagnetic material includes at least one of NiMn, PtMn, PtPdMn, IrMn, and FeMn.

11. A read head according to claim 1, wherein a magnetic tunnel junction height Jh is defined by (0.8×Fw)≦Jh≦(3.0×Fw), where Fw is a flux guide width.

12. A read head according to claim 1, wherein the sensing layer includes a multi-layer of NiFe and CoFe.

13. A read head according to claim 12, wherein a thickness of the NiFe is greater than or equal to 10 Å and a thickness of the CoFe layer is greater than or equal to 15 Å and less than or equal to 40 Å.

14. A read head according to claim 1, wherein the flux guide has a front portion and a back portion, the front portion having a width Ffw and extending generally along a length Fh from a front of the magnetic tunnel junction to the sensing surface, and the back portion having a width Fbw and being adjacent the magnetic tunnel junction, where Ffw is less than a magnetic tunnel junction width Jw.

15. A read head according to claim 14, wherein Jw is defined by $(0.8 \times Ffw) \leq Jw \leq (3.0 \times Ffw)$.

16. A read head according to claim 14, wherein a magnetic junction height Jh is defined by $(0.8 \times Ffw) \leq Jh \leq (3 \times Ffw)$.

17. A read head according to claim 1, wherein sides of the sensing and pinned layers are embedded in an insulating layer.

18. A magnetic field sensing apparatus having a sensing surface for sensing a changing magnetic field, the apparatus comprising:

a magnetic tunnel junction including an electrical insulating layer sandwiched between a first ferromagnetic layer and a second ferromagnetic layer; and a third ferromagnetic layer magnetically coupled to the first layer, the third layer extending to the sensing surface and having a magnetization lower than a magnetization of the first layer, wherein the third layer is generally rectangular-shaped and includes a first planar region wider than an adjacent second planar region of the first layer, the first planar region being parallel to a direction along which the first layer extends, and the entire second planar region is in contact with the first planar region.

19. An apparatus according to claim 18, wherein the third layer includes NiFeX where X is one or more of Ta, Nb, Cu, W, Al, Au, In, Ir, Mg, and Ru.

20. An apparatus according to claim 18, wherein the third layer has a front portion and a back portion, the front portion having a width Ffw and extending generally along a length Fh from a front of the magnetic tunnel junction to the sensing surface, and the back portion having a width Fbw and being adjacent the magnetic tunnel junction, and wherein Ffw is less than a magnetic tunnel junction width Jw.

21. An apparatus according to claim 18, wherein the third layer has a front portion and a back portion, the front portion having a width Ffw and extending generally along a length Fh from a front of the magnetic tunnel junction to the sensing surface, and the back portion having a width Fbw and being adjacent the magnetic tunnel junction, and wherein Fbw is greater than a magnetic tunnel junction width Jw.

22. An apparatus according to claim 18, wherein the sensing surface is at a front of the apparatus, the apparatus further comprising:

a shield generally separated by a gap from a planar surface of the third layer, the shield in contact with a rear end of the third layer.

23. A magnetic tunnel junction read head having a sensing surface for sensing data magnetically recorded on a magnetic recording medium, the read head comprising:

a magnetic tunnel junction including a tunnel barrier layer sandwiched between a ferromagnetic sensing layer and a ferromagnetic pinned layer, the sensing layer being recessed from the sensing surface, the sides of the sensing and pinned layers being embedded in an insulating layer, the junction having a width Jw, and a ferromagnetic flux guide magnetically coupled to the sensing layer, the flux guide extending to the sensing surface and having a magnetization lower than a magnetization of the sensing layer, the flux guide having a front portion and a back portion, the front portion having a width Ffw and extending generally along a length Fh from a front of the magnetic tunnel junction to the sensing surface, and the back portion having a width Fbw and being adjacent the magnetic tunnel junction, wherein Fbw>Jw and Fh is $0.01 \mu m \leq Fh \leq 0.3 \mu m$.

24. A read head according to claim 23, wherein Ffw is less than the magnetic tunnel junction width Jw.

25. A read head according to claim 23, wherein the sensing surface is at a front end of the head, the head further comprising:

a shield generally separated by a gap from a planar surface of the sensing layer, the shield in contact with a rear end of the flux guide.

* * * * *